(12) United States Patent
Yeom et al.

(10) Patent No.: US 10,403,962 B2
(45) Date of Patent: Sep. 3, 2019

(54) ANTENNA DEVICE AND ELECTRONIC DEVICE COMPRISING SAME

(71) Applicant: Samsung Electronics Co., Ltd., Gyeonggi-do (KR)

(72) Inventors: Jung-Hwan Yeom, Gyeonggi-do (KR); Bong-Soo Kang, Gyeonggi-do (KR); Dae-Hun Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/775,545

(22) PCT Filed: Nov. 11, 2016

(86) PCT No.: PCT/KR2016/013021
§ 371 (c)(1),
(2) Date: May 11, 2018

(87) PCT Pub. No.: WO2017/082686
PCT Pub. Date: May 18, 2017

(65) Prior Publication Data
US 2018/0351234 A1    Dec. 6, 2018

(30) Foreign Application Priority Data
Nov. 11, 2015    (KR) .................. 10-2015-0158407

(51) Int. Cl.
*H01Q 1/24*    (2006.01)
*H01Q 9/42*    (2006.01)
(Continued)

(52) U.S. Cl.
CPC ............... *H01Q 1/24* (2013.01); *H01Q 1/243* (2013.01); *H01Q 1/38* (2013.01); *H01Q 9/42* (2013.01); *H01Q 21/28* (2013.01); *H04B 1/16* (2013.01)

(58) Field of Classification Search
CPC .. H01Q 1/24; H01Q 1/38; H01Q 9/42; H01Q 21/28
(Continued)

(56) References Cited

U.S. PATENT DOCUMENTS

2008/0129644 A1    6/2008 Seo et al.
2010/0234066 A1    9/2010 Kobayashi et al.
(Continued)

FOREIGN PATENT DOCUMENTS

KR    1020070070549    7/2007
KR    1020120049056    5/2012
(Continued)

OTHER PUBLICATIONS

PCT/ISA/210 Search Report issued on PCT/KR2016/013021 (pp. 3).
(Continued)

*Primary Examiner* — Andrea Lindgren Baltzell
(74) *Attorney, Agent, or Firm* — The Farrell Law Firm, P.C.

(57) ABSTRACT

An electronic device according to various embodiments is provided and includes a conductive inner module in which a plurality of layers are stacked; an electrical opening formed in at least a portion of the rim of the conductive inner module when stacking the plurality of layers; and an antenna module disposed at the periphery of the electrical opening, wherein the antenna module may include a feeding part formed on at least one of a plurality of layers forming the conductive inner module, and a conductive pattern which is connected to the feeding part and disposed circumferencing at least one of the electrical openings.

14 Claims, 17 Drawing Sheets

(51) Int. Cl.
   *H01Q 21/28*  (2006.01)
   *H01Q 1/38*  (2006.01)
   *H04B 1/16*  (2006.01)

(58) Field of Classification Search
   USPC .................................................. 343/700 MS
   See application file for complete search history.

(56) References Cited

U.S. PATENT DOCUMENTS

| | | | |
|---|---|---|---|
| 2012/0176278 A1* | 7/2012 | Merz ..................... | H01Q 1/243 |
| | | | 343/702 |
| 2013/0050026 A1 | 2/2013 | Vin et al. | |
| 2014/0292596 A1 | 10/2014 | Ou et al. | |
| 2015/0054701 A1 | 2/2015 | Kim et al. | |
| 2015/0155614 A1 | 6/2015 | Youn et al. | |
| 2015/0188230 A1* | 7/2015 | Kim ..................... | H01Q 9/0421 |
| | | | 455/90.2 |

FOREIGN PATENT DOCUMENTS

| | | |
|---|---|---|
| KR | 1020130118919 | 10/2013 |
| KR | 1020150080944 | 7/2015 |
| KR | 1020150106701 | 9/2015 |

OTHER PUBLICATIONS

PCT/ISA/237 Written Opinion issued on PCT/KR2016/013021 (pp. 3).
European Search Report dated Oct. 23, 2018 issued in counterpart application No. 168646123-1205, 10 pages.

* cited by examiner

ANTENNA DEVICE AND ELECTRONIC DEVICE COMPRISING SAME

PRIORITY

This application is a National Phase Entry of International Application No. PCT/KR2016/013021, which was filed on Nov. 11, 2016, and claims priority to Korean Patent Application No. 10-2015-0158407, which was filed on Nov. 11, 2015, the contents of each of which are incorporated herein by reference.

TECHNICAL FIELD

Various embodiments of the present disclosure relate to an antenna device, for example, a method for mounting an antenna on an electronic device.

BACKGROUND ART

Wireless communication technologies have been implemented in various ways ranging from commercialized mobile communication network connection recently to a wireless local area network (WLAN) represented by Wireless Fidelity (Wi-Fi), Bluetooth, near field communication (NFC), and so forth. Mobile communication service has evolved from voice-communication-oriented mobile communication services gradually to ultra-high-speed and high-volume services (e.g., a high-quality video streaming service), and next-generation mobile communication service to be commercialized in the future is expected to be provided in an ultra-high-speed frequency band over several tens of GHz.

As communication standards such as short-range wireless communication, Bluetooth, and so forth have been vitalized, electronic devices, for example, mobile communication terminals have mounted thereon antenna devices operating in different frequency bands. For example, a $4^{th}$-generation (4G) mobile communication service may operate in a frequency band such as 700 MHz, 1.8 GHz, 2.1 GHz, or the like, Wi-Fi may operate in a frequency band such as 2.4 GHz, 5 GHz, or the like in spite of a slight difference depending on rules, and Bluetooth may operate in a frequency band of 2.45 GHz.

The electronic device includes an antenna device to provide a commercialized wireless communication network service.

The electronic device may also have mounted thereon an antenna for a global navigation satellite system.

The global navigation satellite system (GNSS) refers to a system capable of accurately tracking a location of a target on the ground by using a satellite network, and examples of the GNSS may include GLONASS, Galileo Project, a global positioning system (GPS), and so forth. For example, as the global navigation satellite system antenna is mounted on the electronic device, the location of the electronic device may be tracked. The antenna device for the global navigation satellite system may more accurately measure the location of the electronic device between an electronic base station and the electronic device by using a frequency signal of about 1.5 GHz.

Inside the electronic device may be mounted a plurality of antenna devices to implement various frequency bands. The electronic device has also been miniaturized and become slim, and to implement various functions, various modules have been mounted inside the electronic device. As a result, when the antenna device is mounted inside the electronic device, there may be a limitation in a mounting space, and the antenna device has to be mounted by avoiding interference with various modules that may exert interference with or influence upon radiation performance of the antenna device, for example, a receiver, a button, a camera module, a chip module mounted on a circuit board, and so forth, such that a limitation in an installing space as well as a limitation in a mounting location may occur due to the limited installing space.

A plurality of antenna devices may be mounted for various frequency bands in the electronic device, and in the electronic device such as a mobile communication terminal, it is difficult to secure an enough distance between antenna devices to guarantee antenna performance, making it difficult to secure antenna isolation between antennas.

That is, as the installing space of the antenna device is narrowed, the radiation efficiency, gain, bandwidth, and so forth of the antenna device may be lowered, and when a plurality of radiation conductors are arranged in the antenna device, degradation in the performance of the antenna device may be intensified due to cross-interference.

DETAILED DESCRIPTION OF THE INVENTION

Technical Problem

Therefore, various embodiments of the present disclosure provide an antenna device that is easy to install on a small mounting space while securing stable radiation performance, and an electronic device including the antenna device.

Moreover, various embodiments of the present disclosure provide an electronic device in which an antenna module is designed on a location that has not been conventionally available as an antenna design region, for example, a member such as a receiver or the like, thereby guaranteeing upper hemisphere isotropic sensitivity (UHIS) performance.

Technical Solution

An electronic device according to various embodiments of the present disclosure includes a conductive internal module including a plurality of layers stacked therein; an electrical opening formed in at least a partial edge of the conductive internal module when the plurality of layers is stacked; and an antenna module provided in a periphery of the electrical opening, in which the antenna module includes a feeding part formed in at least one of the plurality of layers of the conductive internal module and a conductive pattern connected to the feeding part and arranged on at least one circumference of the electrical opening.

Advantageous Effects

An electronic device according to various embodiments of the present disclosure implements an electrical opening part in a position where a member is arranged on at least a part of an edge of a conductive internal module having a plurality of layers stacked therein, such that an antenna module is arranged in a periphery of the electrical opening part, thereby improving the efficiency of an antenna arranging space and thus enhancing and stabilizing the radiation performance of the antenna device.

Furthermore, by isolating the antenna module mounted on the electronic device, for example, the GPS antenna, from another antenna device, for example, an LTE antenna module, unlike in a conventional art, the degree of isolation may be improved and UHIS performance may be enhanced.

Figure 1:
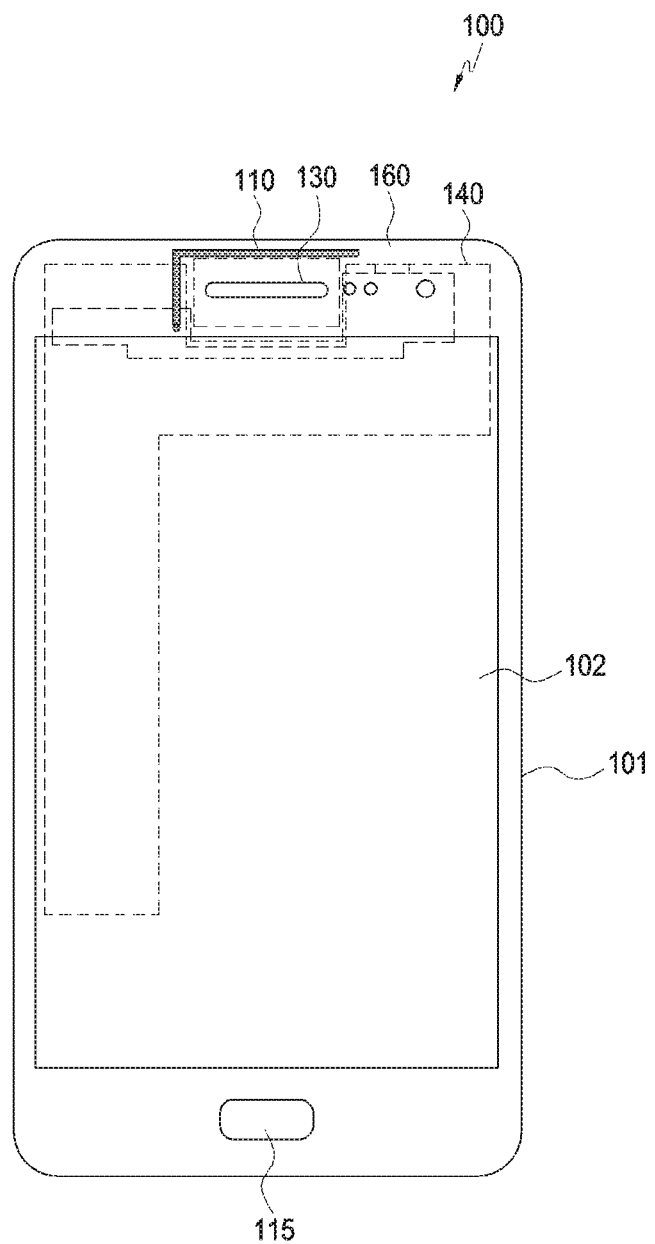
FIG. 1 illustrates an electronic device including an antenna device according to various embodiments of the present disclosure.

| *Reference Numerals in Drawings | |
|---|---|
| 100: Electronic Device | 101: Housing |
| 102: Display Device | 110: Antenna Module |
| 120: Bracket | 130: Member |
| 140: First Substrate | 150: Plate |
| 160: Second Substrate | 170: Antenna Member |
| 190: Case | 200: Conductive Internal Module |
| 210: Electrical Opening Part | |

MODE FOR CARRYING OUT THE INVENTION

Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used herein may represent various elements regardless of order and/or importance and do not limit corresponding elements. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is "operatively or communicatively coupled with/to" or "connected" to another element (such as a second element), the element can be directly connected to the other element or can be connected to the other element through another element (e.g., a third element). However, when it is described that an element (e.g., a first element) is "directly connected" or "directly coupled" to another element (e.g., a second element), it means that there is no intermediate element (e.g., a third element) between the element and the other element.

An expression "configured to (or set or provided)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device. A term "configured to (or set)" does not always mean only "specifically designed to" by hardware.

The terms used in the various exemplary embodiments of the present disclosure are for the purpose of describing particular exemplary embodiments only and are not intended to be limiting. The singular forms are intended to include the plural forms as well, unless the context clearly indicates otherwise. The term "include" or "has" used in the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having meanings that are the same as or similar with the contextual meanings of the relevant technology and should not be interpreted as having ideal or exaggerated meanings unless they are clearly defined in the present disclosure. In some case, terms defined in the present disclosure cannot be analyzed to exclude the present exemplary embodiments.

In various embodiments of the present disclosure, an electronic device may be an arbitrary device having a touch panel and may be referred to as a terminal, a portable terminal, a mobile terminal, a communication terminal, a portable communication terminal, a portable mobile terminal, a display, or the like.

For example, the electronic device may be a smart phone, a cellular phone, a navigation device, a game console, a television (TV), a vehicle head unit, a laptop computer, a tablet computer, a personal media player (PMP), a personal digital assistant (PDA), or the like. The electronic device may be implemented with a pocket-size portable communication terminal having a wireless communication function. The electronic device may be a flexible device or a flexible display.

The electronic device may communicate with an external electronic device such as a server or may work by cooperating with the external electronic device. For example, the electronic device may transmit an image captured by a camera and/or position information detected by a sensor unit to the server over a network. A network may be, but not limited to, a mobile or cellular communication network, a local area network (LAN), a wireless local area network (WLAN), a wide area network (WAN), Internet, a small area network (SAN), or the like.

FIG. 1 illustrates an electronic 100 including an antenna device according to various embodiments of the present disclosure.

Referring to FIG. 1, the electronic device 100 is, for example, a bar-type terminal including one housing 101, and may include a display device 102 arranged on a front surface thereof, an acoustic module for outputting sound or the like, and at least one key 115 arranged on a side of the display device 102. The acoustic module is arranged on a side of the display 102 and may be used for voice communication. The electronic device 100 may include a main circuit board on which integrated circuit chip(s) such as a processor, a communication module, an acoustic module, a memory, and so forth are arranged, and may perform wireless communication by including an antenna device.

Figure 2:
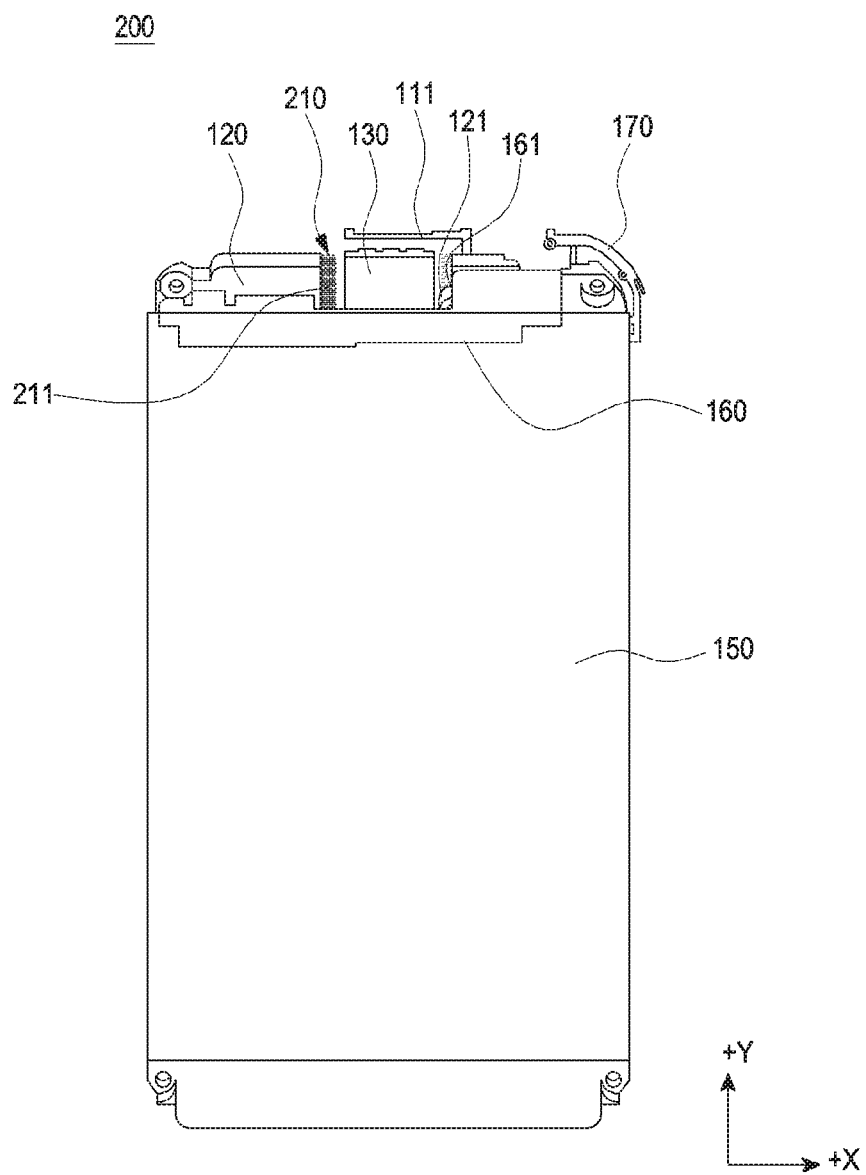
FIG. 2 illustrates an internal structure of an electronic device according to various embodiments of the present disclosure.
Figure 3:
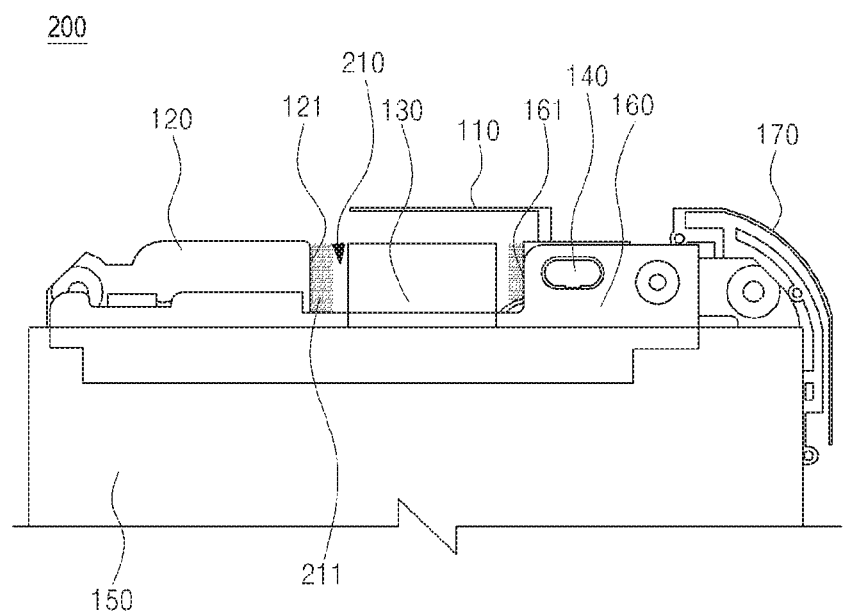
FIG. 3 is an enlarged view of an internal structure of an electronic device having an antenna module mounted thereon according to various embodiments of the present disclosure.
Figure 4:
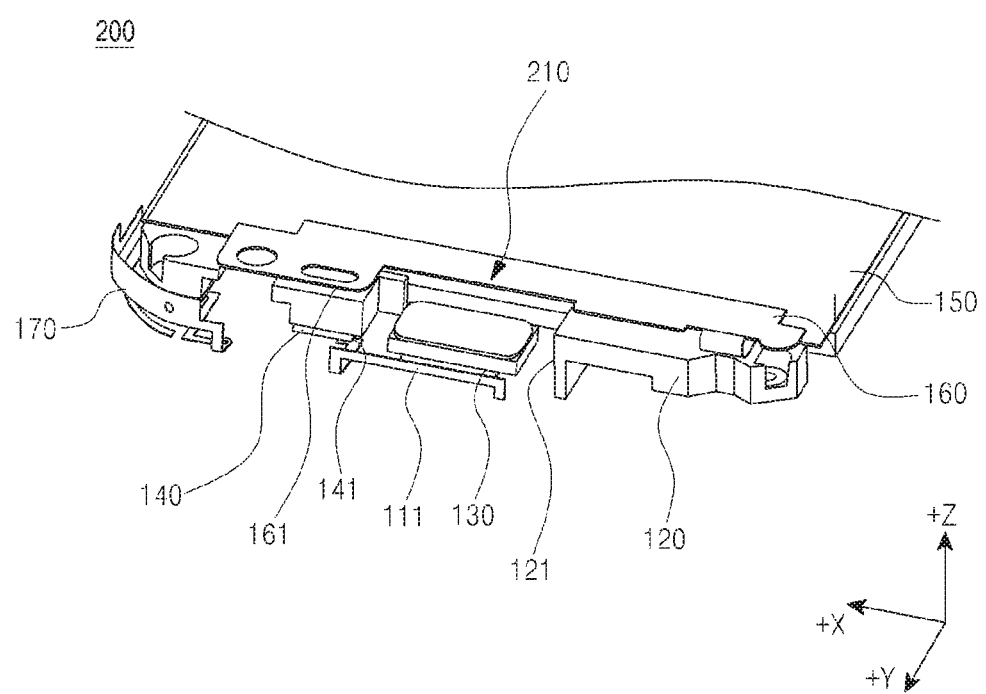
FIG. 4 is a perspective view enlarging an internal structure of an electronic device having an antenna module mounted thereon according to various embodiments of the present disclosure.

FIG. 2 illustrates an internal structure of the electronic device 100 according to various embodiments of the present disclosure. FIG. 3 is an enlarged view of an internal structure of the electronic device 100 having the antenna module 110 mounted thereon according to various embodiments of the present disclosure. FIG. 4 is a perspective view enlarging the internal structure of the electronic device 100 having the antenna module 110 mounted thereon according to various embodiments of the present disclosure.

Referring to FIGS. 2 to 4, in the electronic device 100, for example, the housing 101 are arranged a conductive internal module 200, a dielectric 211, a member 130, and an antenna module 110.

The conductive internal module 200 may include a plurality of layers stacked therein, and in this case, an electrical opening part 210 may be formed in at least some position of an edge of the conductive internal module 200.

For example, the conductive internal module 200 according to various embodiments of the present disclosure may be provided such that a bracket 120, a first substrate 140 (also referred to as a 'main circuit board'), and a second substrate 160 (also referred to as a 'display substrate' or a 'flexible circuit board') are stacked therein, and a display support plate 150 (also referred to as an 'LCD SUS', and hereinafter referred to as a 'plate 150') supporting the display may be further stacked.

Figure 5:
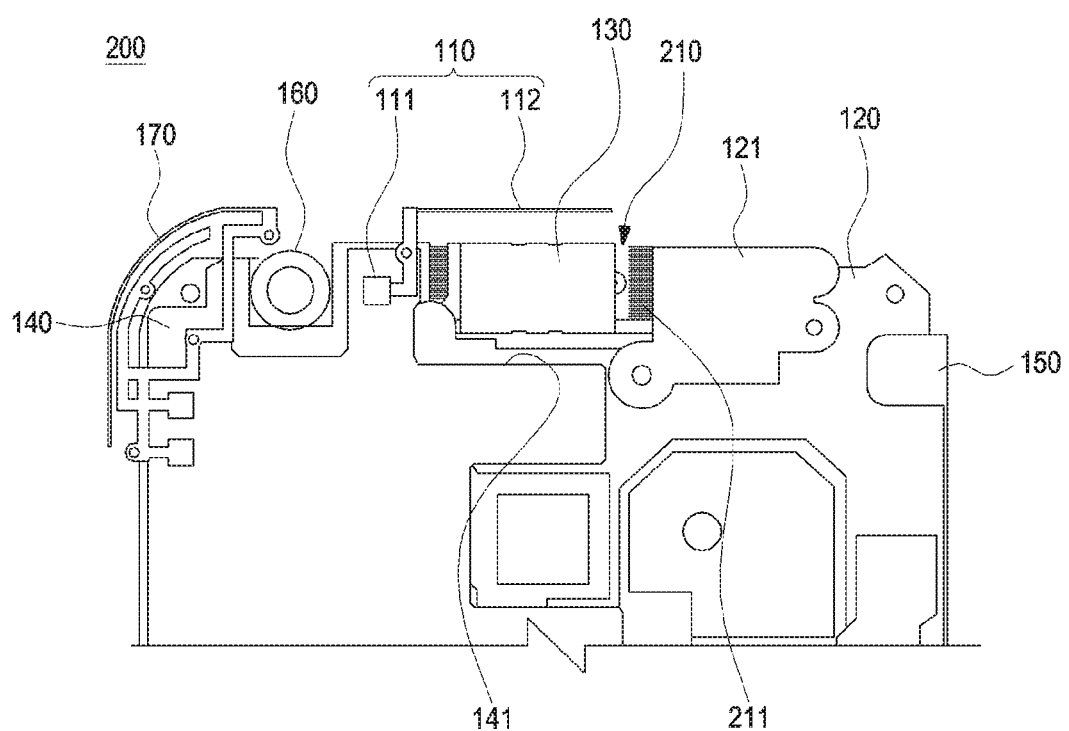
FIG. 5 illustrates an internal structure of an electronic device according to various embodiments of the present disclosure, viewed in another direction.
Figure 6:
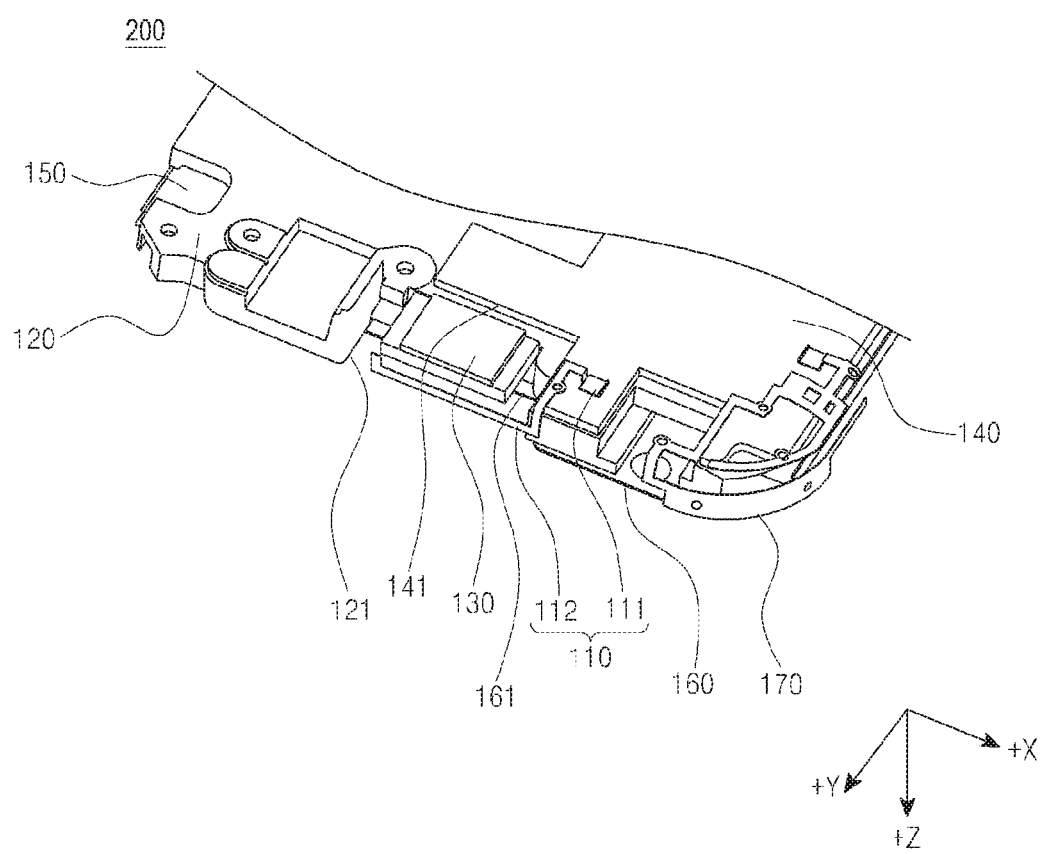
FIG. 6 is a perspective view of an internal structure of an electronic device according to various embodiments of the present disclosure, viewed in another direction.

FIG. 5 illustrates an internal structure of the electronic device 100 according to various embodiments of the present disclosure, viewed in another direction. FIG. 6 is a perspective view of an internal structure of the electronic device 100 according to various embodiments of the present disclosure, viewed in another direction.

Referring to FIGS. 5 and 6, the bracket 120 is arranged on a rear surface of the display in the electronic device 100, for example, the housing 101. On at least some surface of an edge of the bracket 120, for example, a central portion of an upper edge of the bracket 120, a first opening 121 corresponding to a position of the electrical opening part 210 may be provided such that the electrical opening part 210 is formed with stacking with other layers to be described later. That is, the first opening 121 may be formed as a groove that has a 'U' shape and is recessed inward in the central portion of the upper edge of the bracket 120.

In the electrical opening part 210 may be provided or filled the dielectric 211 made of a material having a dielectric permittivity value, for example, the air or a non-conductive material like a separate rear plate, a cover, or a substrate. That is, the electrical opening part 210 formed open in the 'U' shape may be provided to be filled with the dielectric 211. The first opening 121 forms the electrical opening part 210 by overlapping with a second opening 141 and a third opening 161 that are to be described later, and the member 130 such as a receiver module may be mounted in the electrical opening part 210 and a conductor pattern 112 of the antenna module 110 may be arranged to traverse the electrical opening part 210 or above the electric opening part 210.

The first substrate 140 is also referred to as a main circuit board and is stocked on a surface of the bracket 120.

On at least some surface of the edge of the first substrate 140, for example, the central portion of the upper edge of the first substrate 140, the second opening 141 corresponding to the position of the electrical opening part 210 may be provided such that the electrical opening part 210 is formed with stacking with other layers. That is, the second opening 141 may be provided to correspond to a position of the first opening 121. That is, the second opening 141 according to various embodiments of the present disclosure may be formed as a groove that has a 'L' shape and is recessed inward in the upper edge of the first substrate 140 on a central region of the electronic device 100.

The second opening 141 forms the electrical opening part 210 in the central portion of the upper edge of the electronic device 100 by overlapping with the first opening 121 and the third opening 161.

In at least some position of a peripheral circumference of the second opening 141 is arranged a feeding part 111 of the antenna module 110 to be described later. For example, the feeding part 111 may be arranged on a surface of the first substrate 140, which is adjacent to the second opening 141, and may be connected with the conductor pattern 112 that traverses the electrical opening part 210 or is arranged above the electrical opening part 210, thereby feeding electricity to the conductor pattern 112.

The second substrate 160 is also referred to as a display substrate, an LCD substrate, or a flexible circuit board, and is stacked on a surface of the first substrate 140.

On at least some surface of the edge of the second substrate 160, for example, the central portion of the upper edge of the second substrate 160, the third opening 161 corresponding to the position of the electrical opening part 210, that is, the positions of the first opening 121 and the second opening 141, may be provided such that the electrical opening part 210 is formed with stacking with other layers. The third opening 161 according to various embodiments of the present disclosure may be formed as a groove that has a 'U' shape and is recessed inward in the upper edge of the second substrate 160 on the central region of the electronic device 100.

While it has been described that the first opening 121 is formed in the 'U' shape, the second opening 141 is formed in the 'L' shape, and the third opening 161 is formed in the 'U' shape in various embodiments of the present disclosure, the present disclosure is not limited to this example.

For example, the shapes of the first opening 121, the second opening 141, and the third opening 161 may be changed or modified as long as the bracket 120, the first substrate 140, and the second substrate 160 are stacked and form the electrical opening part 210 may be formed in the 'U' shape on at least some region of an edge of the conductive internal module 200, for example, in the central portion of the upper edge of the electronic device 100.

In the conductive internal module 200 may be further stacked the plate 150 for supporting the display device 102, and the plate 150 may be stacked such that an opening is formed in a position corresponding to the electrical opening part 210 or an edge of the plate 150 is positioned under the electrical opening part 210 with respect to the above-described layers. Thus, when the conductive internal module 200 is formed with stacking of the plurality of layers, the shape or structure of an opening formed in each layer may be changed or modified as long as the electrical opening part 210 may be formed in at least some position of the edge of the conductive internal module 200.

According to various embodiments of the present disclosure, a circuit board on which the antenna module 110, more specifically, the feeding part 111 is arranged is illustrated as being arranged on a circumference of the second opening 141 of the first substrate 140, the present disclosure is not limited to this example, the circuit board may be arranged on the circumference of the third opening 161 of the second substrate 160 that is manufactured separately from the first substrate 140. That is, the antenna module 110 may be mounted on the first substrate 140 of the conductive internal module 220 and arranged in the electrical opening part 210 or may be mounted on the second substrate 160 stacked separately from the first substrate 140 and arranged in the electrical opening part 210.

As described above, the electrical opening part 210 may be formed in at least some position of the edge of the conductive internal module 200 having various layers stacked therein, and the member 130 having a function implementable on the electronic device 100, for example, a receiver module, a button, a camera module, a microphone module, or the like may be mounted in the electrical opening part 210. The member 130 according to various embodiments may be described by taking the receiver module arranged on the upper central portion of the electronic device 100 as an example. However, as mentioned above, the member 130 mounted in the electrical opening part 210 may also be mounted on the electronic device 100 as well as on the receiver module to implement one function.

Figure 7:
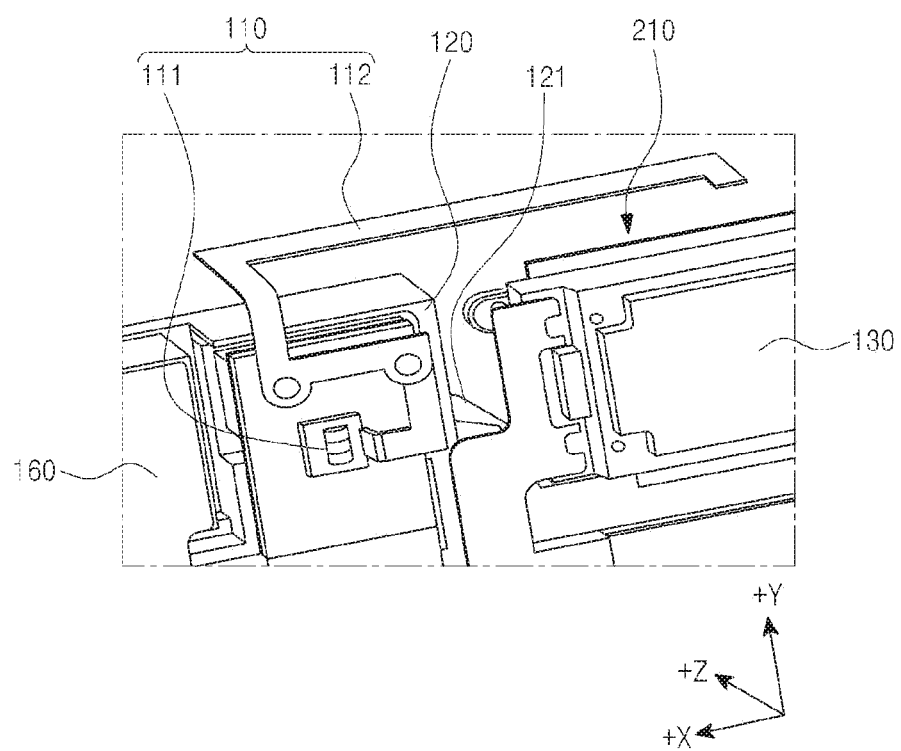
FIG. 7 illustrates a mounting structure of an antenna module in an electronic device according to various embodiments of the present disclosure.

FIG. 7 illustrates a mounting structure of the antenna module 110 in the electronic device 100 according to various embodiments of the present disclosure.

Referring to FIG. 7, the antenna module 110 according to various embodiments may be arranged in the periphery of the electrical opening part 210, may be connected to at least one of the conductive internal module 200, for example, to the first substrate 140 or the second substrate 160, and may extend along the edge of the member 130 arranged in the electrical opening part 210.

The antenna module 110 according to various embodiments may include the feeding part 111 and the conductor pattern 112.

The feeding part 111 may be positioned in the peripheral circumference of the electrical opening part 210 of the conductive internal module 200 and may provide a feeding signal to the conductor pattern 112. The feeding part 111 may be positioned on at least one of the plurality of layers of the conductive internal module 200, for example, on a circumference of the second opening 141 of the first substrate 140 or a circumference of the third opening 161 of the second substrate 160. The feeding part 111 according to various embodiments will be described as being arranged in a periphery of a side of the electrical opening part 210, but the present disclosure is not limited thereto. For example, the feeding part 111 may be arranged in a periphery of a lower portion or another side of the electrical opening part 210.

The conductor pattern 112 is connected to the feeding part 111, and is arranged above the electrical opening part 210 along the periphery of the electrical opening part 210 in the feeding part 111 or passes from a side of the electrical opening part 210 to the other side thereof and is arranged in the periphery of the member 130 mounted in the electrical opening part 210.

Figure 8:
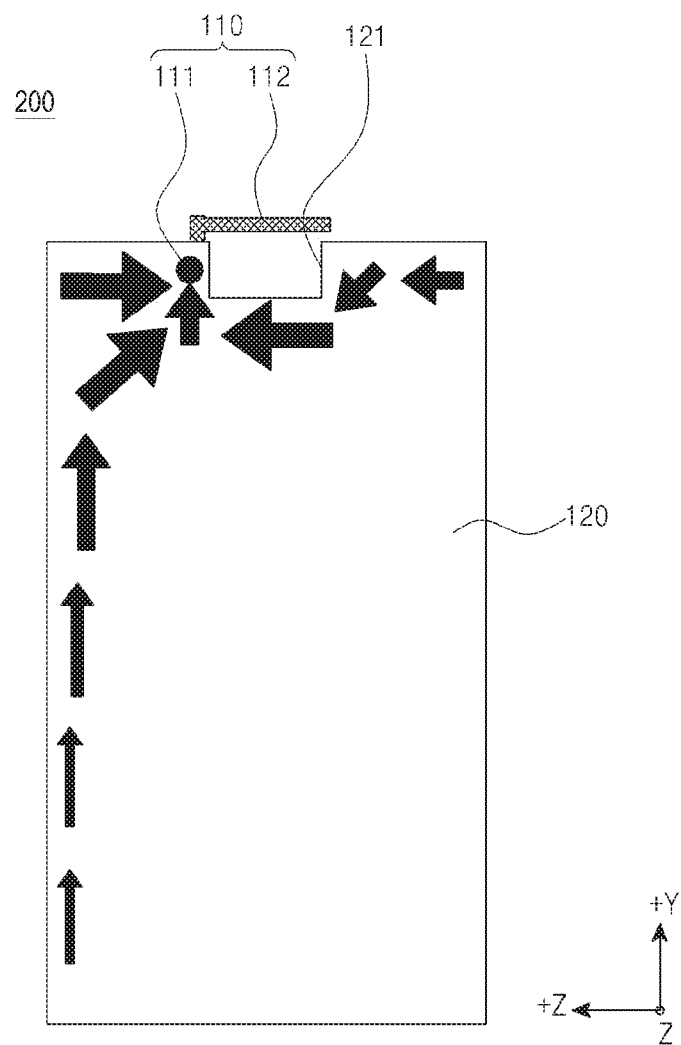
FIG. 8 illustrates a mounting structure of an antenna module according to one embodiment in an electronic device according to various embodiments of the present disclosure.

FIG. 8 illustrates the mounting structure of the antenna module 110 in the electronic device 100 according to various embodiments of the present disclosure.

Referring to FIG. 8 (FIGS. 4, 6, and 7 together), the conductor pattern 112 is connected to the feeding part 111 and is arranged to traverse the upper side of the member 130 on an open region above the electrical opening part 210. More specifically, in the conductor pattern 112, the conductor pattern 112 is arranged along an edge of a side of the electrical opening 210 in a first direction (for example, a longitudinal direction or an upward direction or a +y-axis direction of the electronic device 100), is partially bent from the first direction to a second direction (for example, a '-z-axis direction'), and then extends from the side of the electrical opening part 210 to the other side, that is, in a third direction (for example, a +x-axis direction). Thus, the conductor pattern 112 may be formed in a shape as if it surrounds the edge of the member 130.

Although it has been described that the conductor pattern 112 is formed along the periphery of the electrical opening part 210 as the feeding part 111 is arranged on the circumference of a side of the electrical opening part 210, the present disclosure is not limited to this description. For example, when the feeding part 111 is arranged on the other side, the conductor pattern 112 may be arranged in the first direction along the edge of the other side of the electrical opening part 210, may be partially bent from the first direction to the second direction (the −z-axis direction), and then may extend from the other side of the electrical opening part 210 to the side thereof, that is, in a fourth direction (the −x-axis direction). As such, the mounting direction of the conductor pattern 112 may be modified or changed depending on the position of the feeding part 111.

Figure 9:
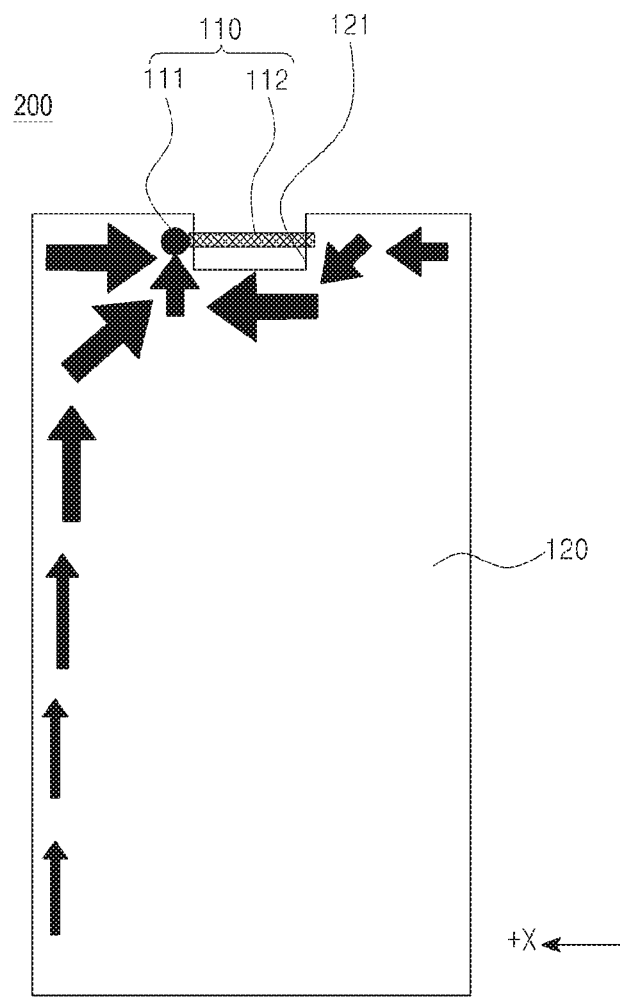
FIG. 9 illustrates a mounting structure of an antenna module according to another embodiment in an electronic device according to various embodiments of the present disclosure.

FIG. 9 illustrates the mounting structure of the antenna module 110 according to another embodiment in the electronic device 100 according to various embodiments of the present disclosure.

Referring to another embodiment of the conductor pattern 112 with reference to FIG. 9, the conductor pattern 112 may be arranged to traverse at least a surface of the member 130 from one side of the electrical opening part 210 to the other side thereof along the edge of one side of the electrical opening part 210 in the feeding part 111. More specifically, the conductor pattern 112 is arranged to traverse the electrical opening part 210 to the other side of the electrical opening part 210, that is, in the +x-axis direction from the feeding part 111 positioned in the edge portion of the side of the electrical opening part 210. Thus, the conductor pattern 112 may be provided to traverse at least a surface of the member 130 mounted in the electrical opening part 210.

Although it has been described that the conductor pattern 112 is formed to traverse the electrical opening part 210 from one side of the electrical opening part 210 to the other side as the feeding part 111 is arranged on the circumference of a side of the electrical opening part 210, the present disclosure is not limited to this description. For example, when the feeding part 111 is positioned on the circumference of the other side of the electrical opening part 210, the conductor pattern 112 may be arranged to traverse the electrical opening part 210 from the other side of the electrical opening part 210 to one side thereof, that is, in the −x-axis direction.

Figure 10A:
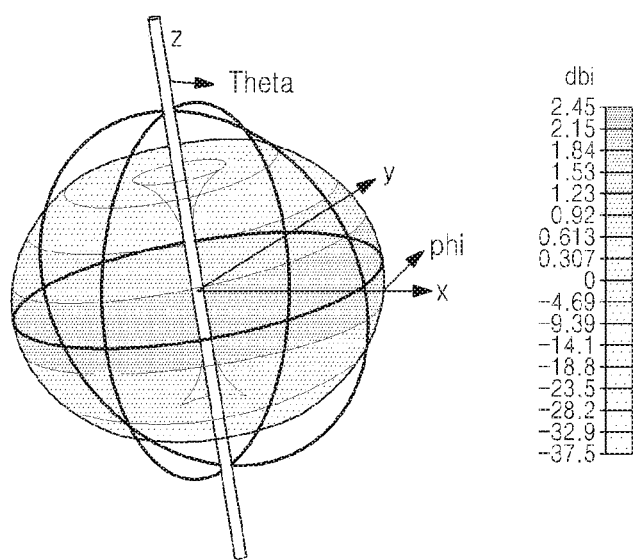
FIG. 10A illustrates a radiation pattern of an antenna module in an electronic device according to various embodiments of the present disclosure.
Figure 10B:
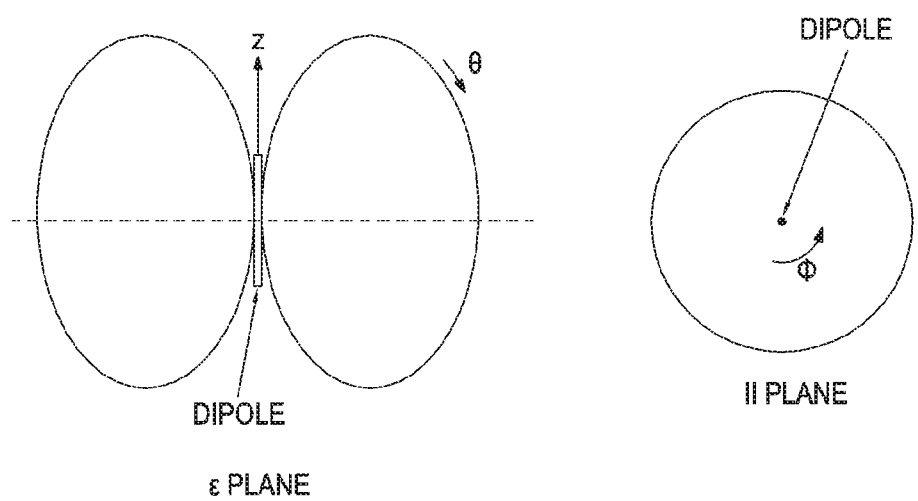
FIG. 10B schematically illustrates a radiation pattern of an antenna module in an electronic device according to various embodiments of the present disclosure.

FIG. 10A illustrates a radiation pattern of the antenna module 110 in the electronic device 100 according to various embodiments of the present disclosure. FIG. 10B illustrates the radiation pattern of the antenna module 110 in the electronic device 100 according to various embodiments of the present disclosure.

Referring to FIGS. 10A and 10B, the antenna module 110 according to various embodiments may include a communication antenna used as a position information system, that is, an antenna for a satellite positioning system, for example, a global navigation satellite system (Glonass) antenna, a Galileo Project antenna, or a global positioning system (GPS) antenna. The antenna module 110 according to various embodiments may be driven in an asymmetric dipole form in the conductive internal module 200, which has a frequency band of about 1.5-1.6 GHz and a wavelength of about 30 cm, and the radiation pattern of the antenna module 110 may also have an omni-directional shape that is similar to a dipole radiation pattern.

Moreover, according to various embodiments of the present disclosure, as the electrical opening part 210 is formed in the conductive internal module 200, the feeding part 111 is arranged on the circumference of the electrical opening part 210, and the antenna module 110 is mounted on the edge of the member 130 arranged in the electrical opening part 210, the flow of induced ground current and the flow of current of the antenna module 110 may have the x-axis direction of the conductive internal module 200 as a dominant direction.

In at least some position of the edge of the conductive internal module 200 according to various embodiments of the present disclosure, antenna members 170 and 130 implementing another frequency band may be further provided in adjacent to the antenna module 110. As mentioned above, the antenna module 110 according to various embodiments of the present disclosure may include a GPS antenna in the central portion of the edge of the upper side of the conductive internal module 200, and the antenna member 170 may include a different antenna than the GPS antenna, for example, an Long-Term Evolution (LTE) antenna.

Figure 11:
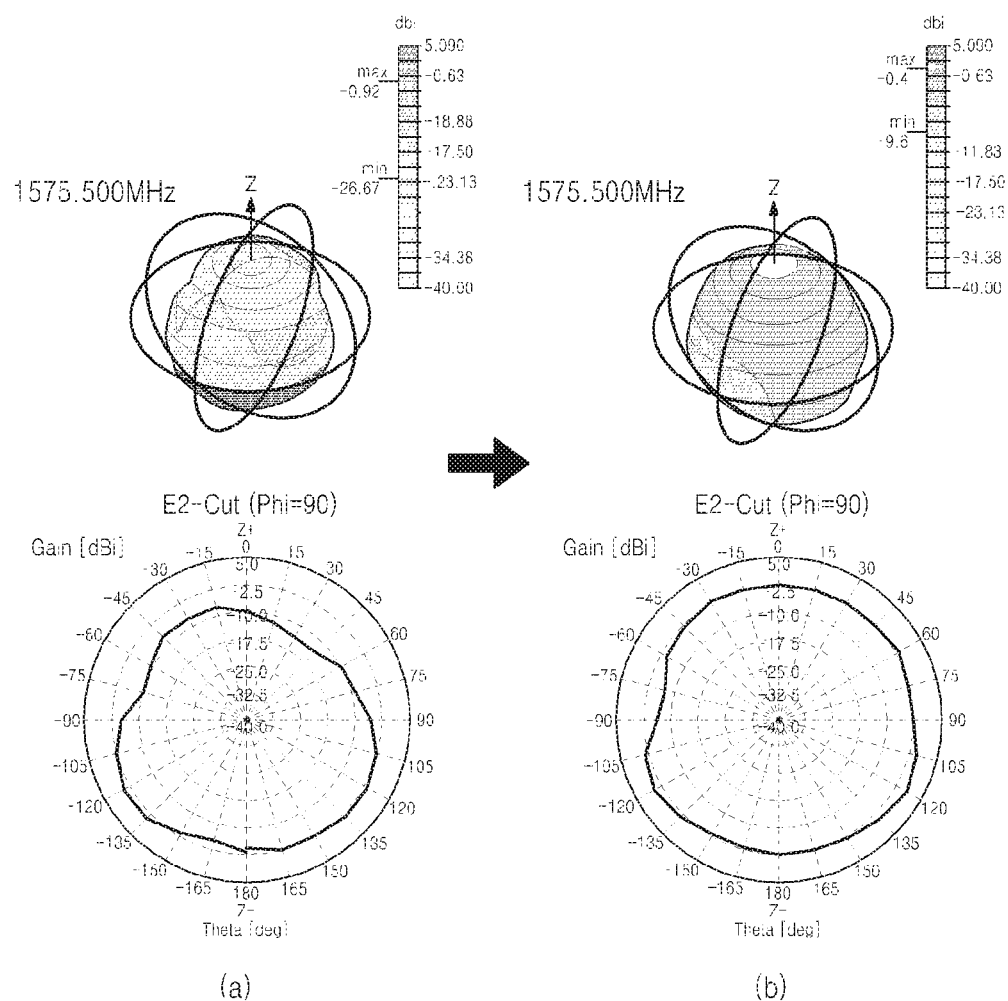
FIG. 11 is a measuring diagram showing UHIS performance of an antenna module in an electronic device according to various embodiments of the present disclosure.

FIG. 11 is a measuring diagram showing upper hemisphere isotropic sensitivity (UHIS) performance of the antenna module 110 in the electronic device 100 according to various embodiments of the present disclosure.

Referring to FIG. 11, the antenna module 110 according to various embodiments of the present disclosure is arranged in the electrical opening part 210 provided on the central portion of the edge of the upper side of the conductive internal module 200. The antenna module 110 may be arranged to overlap the member 130, for example, an edge of the receiver module. The antenna members 170 and 130 are arranged at an upper corner of the edge of the conductive internal module 200. Thus, conventionally, as the GPS antenna is arranged on a side surface of the receiver module, a mounting distance to an LTE antenna is very short; whereas in various embodiments of the present disclosure, as the electrical opening part 210 is formed, the GPS antenna may be arranged in a position of the receiver module, such that spaces may be provided for mounting distances with an antenna for an existing GPS (for example, a GPS antenna) and an LTE antenna, thereby minimizing frequency band interference between antennas.

Figure 12:
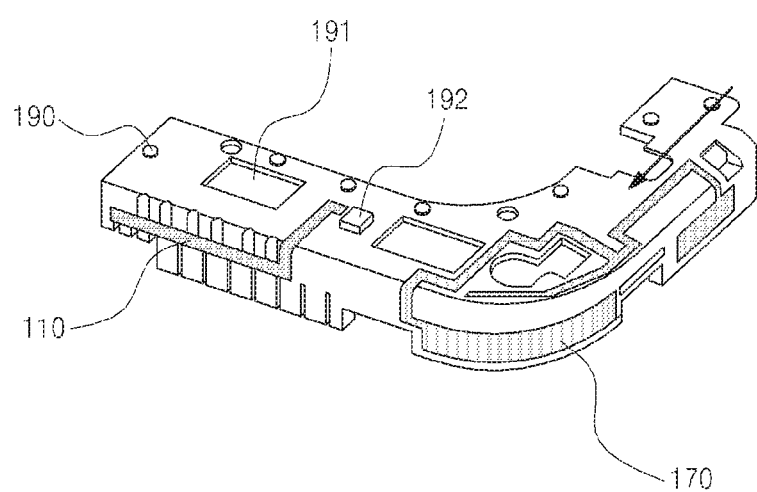
FIG. 12 illustrates a case part and a corresponding mounting structure of an antenna module in an electronic device according to various embodiments of the present disclosure.
Figure 13:
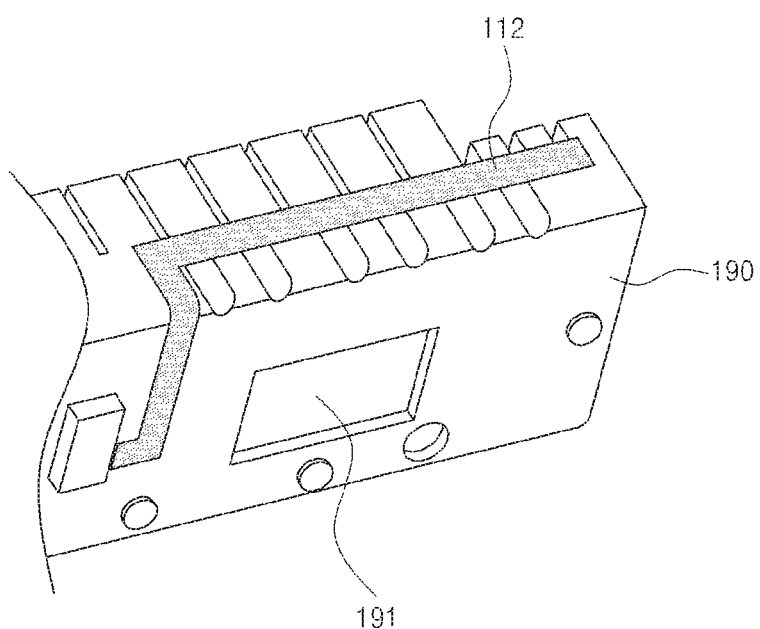
FIG. 13 is a perspective view enlarging portions of a case part in which an antenna module is implemented in an electronic device according to various embodiments of the present disclosure.
Figure 14:
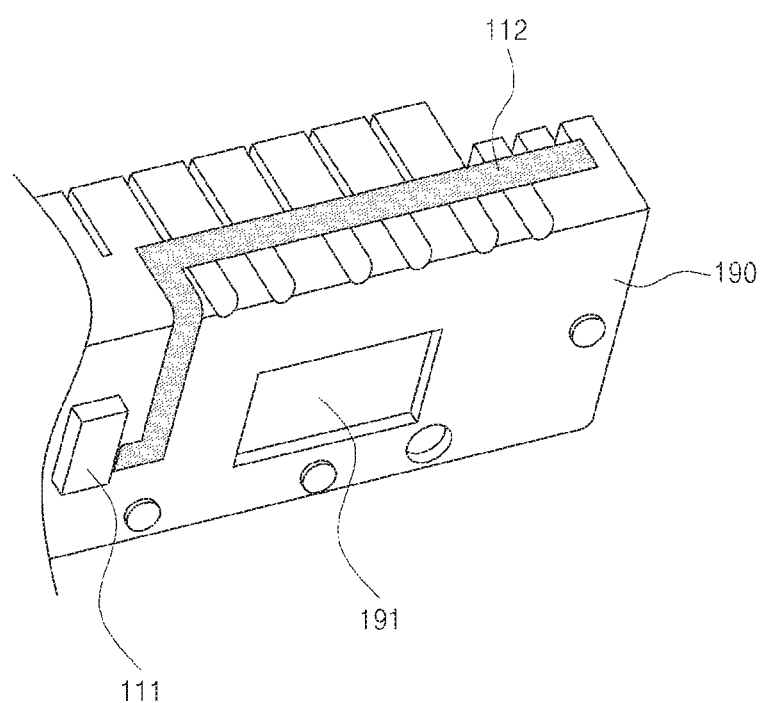
FIG. 14 is a perspective view showing coupling of portions of a case part in which an antenna module is implemented in an electronic device according to various embodiments of the present disclosure.

FIG. 12 illustrates a case part and a corresponding a case part 190 and a corresponding mounting structure of the antenna module 110 in the electronic device 100 according to various embodiments of the present disclosure. FIG. 13 is a perspective view enlarging portions of the case part 190 in which the antenna module 110 is implemented in the electronic device 100 according to various embodiments of the present disclosure. FIG. 14 is a perspective view showing coupling of portions of the case part 190 in which the antenna module 110 is implemented in the electronic device 100 according to various embodiments of the present disclosure.

Referring to FIGS. 12 to 14, on at least a surface of the conductive internal module 200, the case part 190 for covering the conductive internal module 200 while surrounding the same may be further provided. For example, the case part 190 may be a part of a rear case or may be a structure mounted inside a main body. In various embodiments, the case part 190 may be provided to surround an upper edge and a part of one surface of the conductive internal module 200. In the case part 190 may be provided an opening 191 that exposes at least a part to expose the member 130 mounted in the electrical opening part 210 in correspondence to the electrical opening part 210, for example, a part of the receiver module, to an outer side of the main body. The antenna module 110 according to various embodiments, for example, the conductor pattern 112 may be mounted in a peripheral position of the opening through a via-hole 192 of the case part 190 to overlap the edge of the receiver module.

The antenna members 170 and 130 may also be mounted at the upper corner of the case part 190 on the outer surface of the case part 190.

As described above, the antenna module 110 according to various embodiments of the present disclosure may improve the efficiency of an arrangement space of the antenna device by using a space of a mounting place of the receiver module and may also enhance isolation from the other antenna members 170 and 130 adjacent to the antenna module 110. Consequently, the UHIS performance of the antenna module 110, more specifically, the GPS antenna may be seen as shown in the drawing.

As described above, an electronic device according to various embodiments of the present disclosure may include a conductive internal module including a plurality of layers stacked therein; an electrical opening part formed in at least a partial edge of the conductive internal module when the plurality of layers is stacked; and an antenna module provided in a periphery of the electrical opening part, in which the antenna module includes a feeding part formed in at least one of the plurality of layers of the conductive internal module and a conductor pattern connected to the feeding part and arranged on at least one circumference of the electrical opening.

According to various embodiments, a member may be mounted in the electrical opening part, and the antenna module may be arranged in a periphery of an edge of the member.

According to various embodiments, the member may include a receiver module.

According to various embodiments, the conductive internal module may include a bracket arranged inside the electronic device, a first substrate stacked on a surface of the bracket, and a second substrate stacked on a surface of the first substrate, in which the electrical opening part includes a first opening arranged on at least a surface of the bracket, a second opening provided on the first substrate and provided in a position corresponding to the first opening, and a third opening provided on the second substrate and provided in a position corresponding to the second opening.

According to various embodiments, the feeding part may be arranged in a periphery of the first opening in the first substrate.

According to various embodiments, the case part covering, while surrounding, the conductive internal module is further provided on at least a surface of the conductive internal module.

According to various embodiments, an opening exposing at least a portion of the member mounted in the electrical opening part in correspondence to the electrical opening part may be provided in the case part, and the conductor pattern may be mounted in a peripheral position of the opening through a via-hole of the case part.

According to various embodiments, the conductor pattern may be arranged to traverse an upper portion of the member from the feeding part to an upper open region of the electrical opening part along an edge of a side of the electrical opening part.

According to various embodiments, the conductor pattern may be arranged to traverse at least one surface of the member from the feeding part along an edge of a side of the electrical opening part in a direction from the side to another side of the electrical opening part.

According to various embodiments, the antenna module may include a global navigation satellite system antenna.

According to various embodiments, the electrical opening part may be provided in a central region of an upper edge of the conductive internal module.

According to various embodiments, the electronic device may further include an antenna member that implements a frequency band being different from the antenna module on at least a partial edge portion of the conductive internal module in adjacent to the antenna module.

According to various embodiments, a dielectric surrounding the electrical opening part may be provided on a circumference of the electrical opening part.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device.

Figure 15:
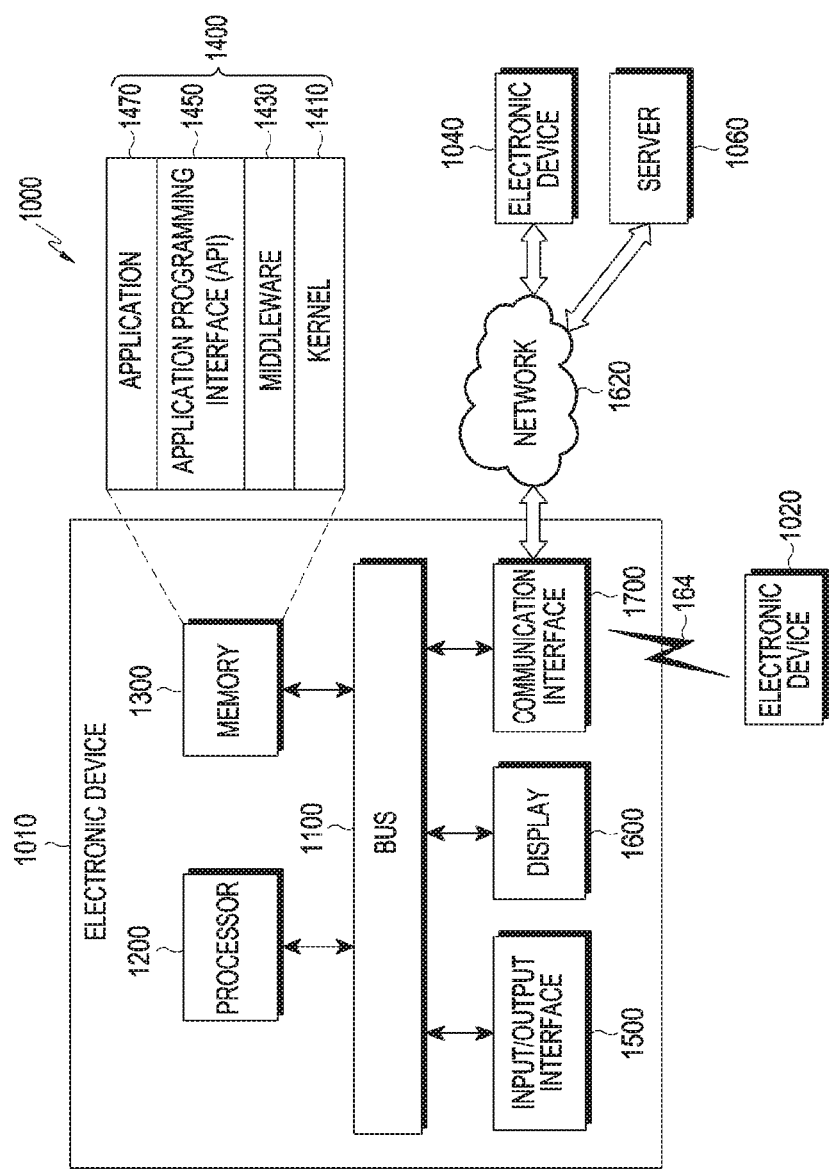
FIG. 15 illustrates an electronic device in a network environment according to various embodiments of the present disclosure.

Referring to FIG. 15, an electronic device 1010 in a network environment 1000 according to various embodiments of the present disclosure is disclosed. The electronic device 1010 may include a bus 110, a processor 1200, a memory 1300, an input/output (I/O) interface 1500, a display 1600, and a communication interface 1700. According to some embodiments, the electronic device 1010 may omit at least one of the foregoing elements or may further include other elements.

The bus 110 may include a circuit for connecting, e.g., the elements 1200, 1300, and 150 to 1700 and delivering communication (e.g., a control message and/or data) between the elements 1200, 1300, and 1500 to 1700.

The processor 1200 may include one or more of a central processing unit (CPU), an application processor (AP), and a communication processor (CP). The processor 1200 performs operations or data processing for control and/or communication of, for example, at least one other elements of the electronic device 1010. The processor 1200 may be referred to as a controller, may include the controller as a part thereof, or may constitute the controller.

The memory 1300 may include a volatile and/or nonvolatile memory. The memory 1300 may store, for example, instructions or data associated with at least one other elements of the electronic device 1010. According to an embodiment of the present disclosure, the memory 1300 may store software and/or a program 1400. The program 1400 may include at least one of, for example, a kernel 1410, middleware 1430, an application programming interface (API) 1450, and/or an application program (or "application") 1470, and the like. At least some of the kernel 1410, the middleware 1430, and the API 1450 may be referred to as an operating system (OS).

The kernel 1410 may control or manage, for example, system resources (e.g., the bus 110, the processor 1200, the memory 1300, etc.) used to execute operations or functions implemented in other programs (e.g., the middleware 1430, the API 1450, or the application program 1470). The kernel 1410 provides an interface through which the middleware 1430, the API 1450, or the application program 1470 accesses separate components of the electronic device 1010 to control or manage the system resources.

The middleware 1430 may work as an intermediary for allowing, for example, the API 1450 or the application program 1470 to exchange data in communication with the kernel 1410.

In addition, the middleware 1430 may process one or more task requests received from the application program 1470 based on priorities. For example, the middleware 1430 may give a priority for using a system resource (e.g., the bus 110, the processor 1200, the memory 1300, etc.) of the electronic device 1010 to at least one of the application programs 1470. For example, the middleware 1430 may perform scheduling or load balancing with respect to the one or more task requests by processing the one or more task requests based on the priority given to the at least one of the application programs 147.

The API 1450 is an interface used for the application 1470 to control a function provided by the kernel 1410 or the middleware 1430, and may include, for example, at least one interface or function (e.g., a command) for file control, window control, image processing or character control.

The I/O interface 1500 serves as an interface for delivering, for example, a command or data input from a user or another external device to other component(s) of the electronic device 1010. The I/O interface 1500 may also output a command or data received from other component(s) of the electronic device 1010 to a user or another external device.

The display 1600 may include, for example, a liquid crystal display (LCD), a light emitting diode (LED) display, an organic light emitting diode (OLED) display, a microelectromechanical system (MEMS) display, or an electronic paper display. The display 1600 may, for example, display various contents (e.g., a text, an image, video, an icon, a symbol, etc.) to users. The display 1600 may include a touch screen, and receives a touch, a gesture, proximity, or a hovering input, for example, by using an electronic pen or a part of a body of a user.

The communication interface 1700 establishes communication between the electronic device 1010 and an external device (e.g., a first external electronic device 1020, a second external electronic device 1040, or a server 1060). For example, the communication interface 1700 may be connected to a network 1620 through wireless communication or wired communication to communicate with an external device (e.g., the second external electronic device 1040 or the server 1060). The communication interface 1700 may include a communication processor (CP) that may constitute one of a plurality of modules of the communication interface 1700. In an embodiment, the CP may be included in the processor 1200.

The wireless communication may use, as a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). The wired communication may include, for example, short-range communication 1640. The short-range communication 1640 may include, for example, at least one of WiFi, Bluetooth, NFC, and GNSS. Depending on a usage area or bandwidth, the GNSS may include, for example, at least one of a global positioning system (GPS), a global navigation satellite system (Glonass), a Beidou navigation satellite system ("Beidou"), and Galileo, and the European global satellite-based navigation system. Hereinbelow, "GPS" may be used interchangeably with "GNSS". The wired communication may include, for example, at least one of USB, a high definition multimedia interface (HDMI), recommended standard 23200 (RS-23200), and a plain old telephone service (POTS). The network 1620 may include a telecommunications network, for example, at least one of a computer network (e.g., a local area network (LAN) or a wide area network (WAN)), Internet, and a telephone network.

Each of the first external electronic device 1020 and the second external electronic device 1040 may be a device of the same type as or a different type than the electronic device 1010. According to an embodiment of the present disclosure, the server 1060 may include a group of one or more servers. According to various embodiments of the present disclosure, some or all of operations performed by the electronic device 1010 may be performed in another electronic device or a plurality of electronic devices (e.g., the electronic device 1020, 1040 or the server 1060). According to an embodiment of the present disclosure, when the electronic device 1010 has to perform a function or a service automatically or at a request, the electronic device 1010 may request another device (e.g., the electronic devices 1020 or 1040 or the server 1060) to perform at least some functions associated with the function or the service instead of or in addition to executing the function or the service. The other electronic device (e.g., the electronic device 1020 or 1040 or the server 1060) may execute the requested function or additional function and deliver the execution result to the electronic device 1010. The electronic device 1010 may then process or further process the received result to provide the requested function or service. To that end, a cloud computing, distributed computing, or client-server computing technology may be used, for example.

Figure 16:
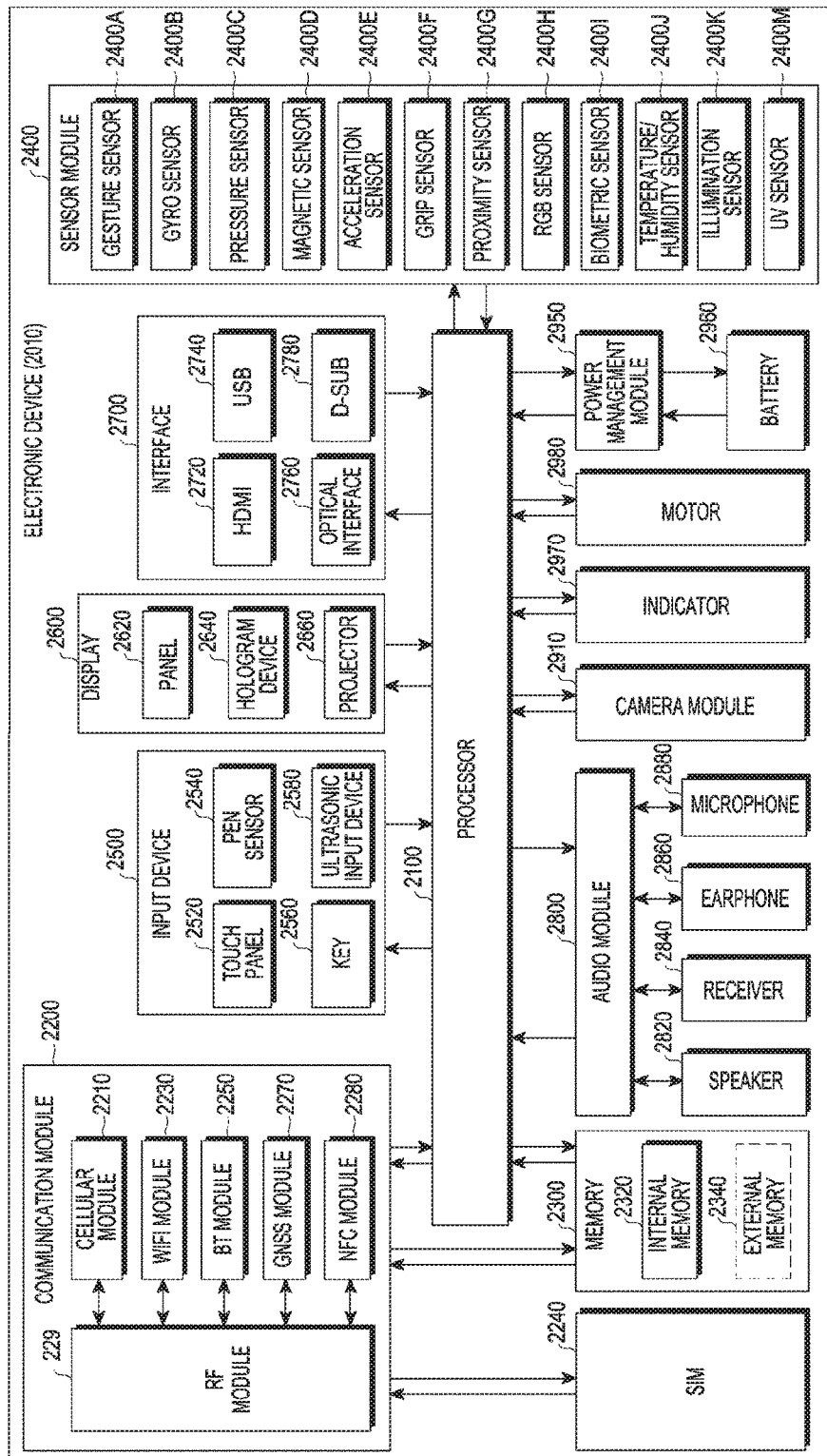
FIG. 16 is a block diagram of an electronic device according to various embodiments of the present disclosure.

FIG. 16 is a block diagram of an electronic device 2010 according to various embodiments of the present disclosure. The electronic device 2010 may form the entire electronic device 1010 illustrated in FIG. 1 or a part of the electronic device 101 illustrated in FIG. 1. The electronic device 2010 may include one or more application processors (APs) 2100, a communication module 2200, a memory 2300, a sensor module 2400, an input device 2500, and a display 2600, and the electronic device 2010 may further include at least one of a subscriber identification module (SIM) 2240, an interface 2700, an audio module 2800, a camera module 2910, a power management module 2950, a battery 2960, an indicator 2970, and a motor 2980.

The processor 2100 controls multiple hardware or software components connected to the processor 2100 by driving an Operating System (OS) or an application program and performs processing and operations with respect to various data. The processor 2100 may be implemented with, for example, a system on chip (SoC). According to an embodiment of the present disclosure, the server 2100 may include a GPU and/or an image signal processor. The processor 2100 may include at least some of the elements illustrated in FIG. 2 (e.g., the cellular module 2210). The processor 2100 loads a command or data received from at least one of other elements (e.g., a non-volatile memory) into a volatile memory to process the command or data and stores various data in the non-volatile memory.

The communication module 2200 may have a configuration that is the same as or similar to the communication interface 1700 illustrated in FIG. 1. The communication module 2200 may include, for example, at least one of the cellular module 2210, a WiFi module 2230, a Bluetooth (BT) module 2250, a GNSS module 2270 (e.g., a GPS module, a Glonass module, a Beidou module, or a Galileo module), a near field communication (NFC) module 2280, and a radio frequency (RF) module 2290.

The cellular module 2210 may provide, for example, a voice call, a video call, a text service, or an Internet service over a communication network. According to an embodiment, the cellular module 2210 identifies and authenticates the electronic device 2010 in a communication network by using the SIM 2240 (e.g., a SIM card). According to an embodiment, the cellular module 2210 performs at least one of functions that may be provided by the processor 2100. According to an embodiment, the cellular module 2210 may include a communication processor (CP).

Each of the WiFi module 2230, the BT module 2250, the GNSS module 2270, and the NFC module 2280 may include, for example, a processor for processing data transmitted and received by a corresponding module. According to an embodiment, at least some (e.g., two or more) of the cellular module 2210, the WiFi module 2230, the BT module 2250, the GNSS module 2270, and the NFC module 2280 may be included in one integrated chip (IC) or IC package.

The RF module 2290 may, for example, transmit and receive a communication signal (e.g., an RF signal). The RF module 2290 may include a transceiver, a power amp module (PAM), a frequency filter, a low noise amplifier (LNA), or an antenna. According to another embodiment, at least one of the cellular module 2210, the WiFi module 2230, the BT module 2250, the GNSS module 2270, and the NFC module 2280 may transmit and receive an RF signal through the separate RF module.

The SIM 2240 may include, for example, a card including an SIM and/or an embedded SIM, and may include unique identification information (e.g., an integrated circuit card identifier (ICCID) or subscriber information (e.g., an international mobile subscriber identity (IMSI)).

The memory 2300 (e.g., the memory 1300) may, for example, include an internal memory 2320 and/or an external memory 2340. The internal memory 2320 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, NAND flash memory, NOR flash memory, etc.), and a solid state drive (SSD).

The external memory 2340 may further include flash drive, for example, compact flash (CF), secure digital (SD), micro-SD, mini-SD, extreme Digital (xD), a multi-media card (MMC), or a memory stick. The external memory 2340 may be functionally and/or physically connected with the electronic device 2010 through various interfaces.

The sensor module 2400 measures physical quantity or senses an operation state of the electronic device 2010 to convert the measured or sensed information into an electric signal. The sensor module 2400 may, for example, include at least one of a gesture sensor 2400A, a gyro sensor 2400B, a pressure sensor 2400C, a magnetic sensor 2400D, an acceleration sensor 2400E, a grip sensor 2400F, a proximity sensor 2400G, a color sensor 2400H (e.g., RGB sensor), a biometric sensor 2400I, a temperature/humidity sensor 2400J, an illumination sensor 2400K, and a ultraviolet (UV) sensor 2400M. Additionally or alternatively, the sensor module 2400 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 2400 may further include a control circuit for controlling at least one sensor included therein. In an embodiment, the electronic device 2010 may further include a processor configured to control the sensor module 2400 as part of or separately from the processor 2100, to control the sensor module 2400 during a sleep state of the processor 2100.

The input module 2500 may, for example, include a touch panel 2520, and may further include at least one of a (digital) pen sensor 2540, a key 2560, and an ultrasonic input device 2580. The touch panel 2520 may use at least one of a capacitive type, a resistive type, an IR type, or an ultrasonic type. The touch panel 2520 may further include a control circuit. The touch panel 2520 may further include a tactile layer to provide tactile reaction to the user.

The (digital) pen sensor 2540 may include a recognition sheet which is a part of the touch panel 252 or a separate recognition sheet. The key 2560 may also include a physical button, an optical key, or a keypad. The ultrasonic input device 2580 senses ultrasonic waves generated by an input means through a microphone (e.g., the microphone 2880) and checks data corresponding to the sensed ultrasonic waves.

The display 2600 (e.g., the display 1600) may include a panel 2620, and may further include a hologram device 2640, and/or a projector 2660. The panel 2620 may have a configuration that is the same as or similar to the display 1600 illustrated in FIG. 1. The panel 2620 may be implemented to be flexible, transparent, or wearable. The panel 2620 may be configured with the touch panel 2520 in one module. The hologram device 2640 shows a stereoscopic image in the air by using interference of light. The projector 2660 displays an image onto a screen through projection of light. The screen may be positioned inside or outside the electronic device 2010. According to an embodiment, the display 2600 may further include a control circuit for controlling the panel 2620, the hologram device 2640, or the projector 2660.

According to an embodiment, the interface 2700 may include at least one of a high-definition multimedia interface (HDMI) 2720, a universal serial bus (USB) 2740, an optical communication 2760, and a D-subminiature 2780. The interface 2700 may be included in the communication interface 1700 illustrated in FIG. 1. Additionally or alternatively, the interface 2700 may include, for example, a mobile high-definition link (MHL) interface, an SD card/MMC interface, or an Infrared Data Association (IrDA) standard interface.

The audio module 2800 bi-directionally converts sound and an electric signal. At least some element of the audio module 2800 may be included, for example, in the I/O interface 1500 illustrated in FIG. 1. The audio module 2800 processes sound information input or output through the speaker 2820, the receiver 2840, the earphone 2860, or the microphone 2880.

The camera module 2910 is a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.).

The power management module 2950 manages power of the electronic device 2010. According to an embodiment, the power management module 2950 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and may further include an additional circuit for wireless charging, for example, a coil loop, a resonance circuit, or a rectifier. The battery gauge measures the remaining capacity of the battery 2960 or the voltage, current, or temperature of the battery 296 during charging. The battery 2960 may include, for example, a rechargeable battery and/or a solar battery.

The indicator 2970 displays a particular state, for example, a booting state, a message state, or a charging state, of the electronic device 2010 or a part thereof (e.g., the processor 2100). The motor 2980 converts an electric signal into mechanical vibration or generates vibration or a haptic effect. Although not shown, the electronic device 2010 may include a processing device (e.g., a GPU) for supporting a mobile TV. The processing device for supporting the mobile TV processes media data according to, a standard such as digital multimedia broadcasting (DMB), digital video broadcasting (DVB), or mediaFlo™.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

While embodiments of the present disclosure have been described, it would be obvious to those of ordinary skill in the art that various changes may be made without departing the scope of the present disclosure.

The invention claimed is:

1. An electronic device comprising:
   a conductive internal module comprising a plurality of layers stacked therein;
   an electrical opening part formed in at least a partial edge of the conductive internal module when the plurality of layers is stacked; and
   an antenna module provided in a periphery of the electrical opening part,
   wherein the antenna module comprises a feeding part formed in at least one of the plurality of layers of the conductive internal module and a conductor pattern connected to the feeding part and arranged on at least one circumference of the electrical opening part.

2. The electronic device of claim 1, wherein a member is mounted in the electrical opening part, and the antenna module is arranged in a periphery of an edge of the member.

3. The electronic device of claim 2, wherein the member comprises a receiver module.

4. The electronic device of claim 2, wherein the conductive internal module comprises:
   a bracket arranged inside the electronic device;
   a first substrate stacked on a surface of the bracket; and
   a second substrate stacked on a surface of the first substrate.

5. The electronic device of claim 4, wherein the electrical opening comprises:
   a first opening arranged on at least a surface of the bracket;
   a second opening provided on the first substrate and provided in a position corresponding to the first opening; and
   a third opening provided on the second substrate and provided in a position corresponding to the second opening.

6. The electronic device of claim 5, wherein the feeding part is arranged in a periphery of the first opening in the first substrate.

7. The electronic device of claim 2, wherein a case part covering, while surrounding, the conductive internal module is further provided on at least a surface of the conductive internal module.

8. The electronic device of claim 7, wherein an opening exposing at least a portion of the member mounted in the electrical opening part in correspondence to the electrical opening part is provided in the case part, and
   the conductor pattern is mounted in a peripheral position of the opening through a via-hole of the case part.

9. The electronic device of claim 2, wherein the conductor pattern is arranged to traverse an upper portion of the member from the feeding part to an upper open region of the electrical opening part along an edge of a side of the electrical opening part.

10. The electronic device of claim 2, wherein the conductor pattern is arranged to traverse at least one surface of the member from the feeding part along an edge of a side of the electrical opening part in a direction from the side to another side of the electrical opening part.

11. The electronic device of claim 1, wherein the antenna module comprises a global navigation satellite system antenna.

12. The electronic device of claim 1, wherein the electrical opening part is provided in a central region of an upper edge of the conductive internal module.

13. The electronic device of claim 1, further comprising an antenna member that implements a frequency band being different from the antenna module on at least a partial edge portion of the conductive internal module in adjacent to the antenna module.

14. The electronic device of claim 1, wherein a dielectric surrounding the electrical opening part is provided on a circumference of the electrical opening part.

* * * * *